United States Patent [19]

Cole et al.

[11] 4,082,168

[45] Apr. 4, 1978

[54] HYDRAULIC BRAKE SYSTEM FOR GOOSENECK TRAILERS

[76] Inventors: Victor L. Cole, 116 Tenth St., Sanger, Tex. 76266; Kenneth D. Perry, 1210 Edinburgh, Denton, Tex. 76201

[21] Appl. No.: 728,113

[22] Filed: Sep. 30, 1976

[51] Int. Cl.² ............................................... B60T 7/20
[52] U.S. Cl. .......................... 188/112 R; 280/423 R; 280/446 R
[58] Field of Search ....................... 188/3 R, 112, 3 H; 280/446 R, 446 B, 423 R

[56] References Cited

U.S. PATENT DOCUMENTS

| | | | |
|---|---|---|---|
| 2,425,521 | 8/1947 | Ellberg | 280/423 R X |
| 2,936,048 | 5/1960 | Love | 188/112 |
| 2,956,648 | 10/1960 | McDaniel, Sr. | 188/112 |
| 2,960,194 | 11/1960 | Stromberg | 188/112 |
| 3,065,830 | 11/1962 | Krotz | 188/112 |
| 3,077,248 | 2/1963 | Wayt | 188/112 |
| 3,141,529 | 7/1964 | Hart | 188/112 |
| 3,433,503 | 3/1969 | Davis | 280/423 R X |
| 3,505,815 | 4/1970 | Wherry | 188/112 X |
| 3,527,324 | 9/1970 | Butler et al. | 188/112 |
| 3,682,278 | 8/1972 | Wherry et al. | 188/112 |
| 3,881,577 | 5/1975 | Wherry et al. | 188/112 |
| 3,893,713 | 7/1975 | Ivy | 280/423 R X |
| 3,948,566 | 4/1976 | Salam | 188/112 X |

*Primary Examiner*—George E. A. Halvosa

[57] ABSTRACT

In an apparatus for applying hydraulic trailer brakes a sleeve member secured to a trailer towed by a towing vehicle is pivotally supported at the top of an upstanding post member that is secured to the towing vehicle. An arm extends rearwardly from the sleeve member and a hydraulic master cylinder apparatus is mounted within the arm for actuation upon pivotal movement of the arm with respect to the upstanding post member. Springs and shock absorbers are mounted between the arm and the upstanding post member for regulating pivotal movement therebetween.

3 Claims, 5 Drawing Figures

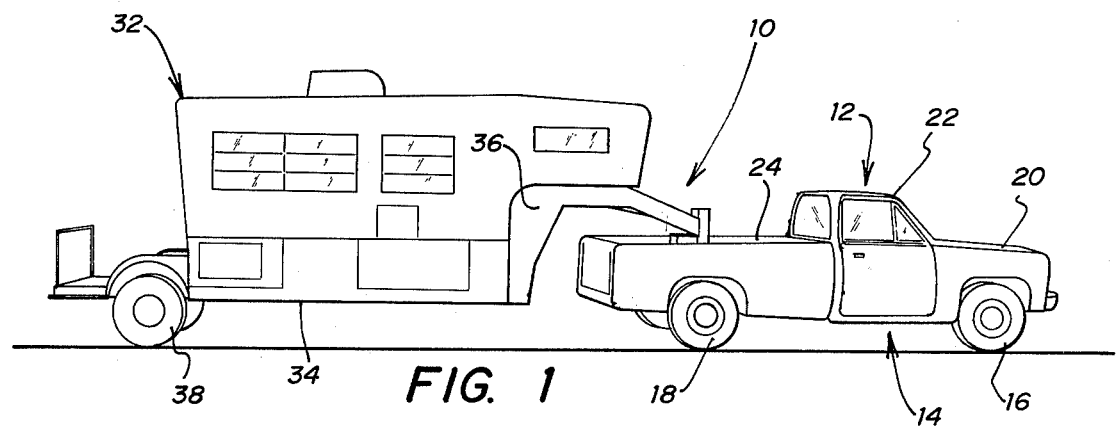
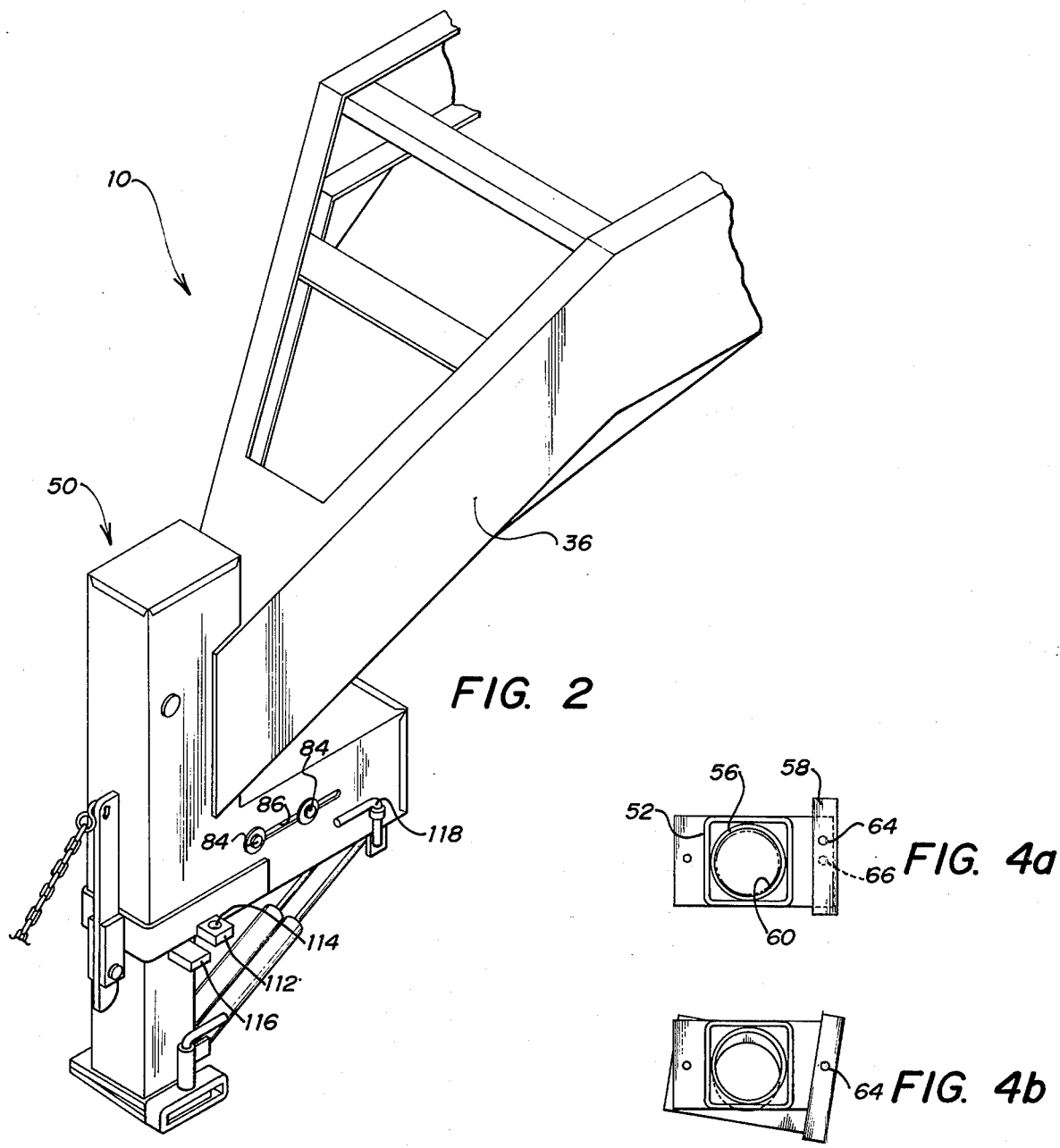
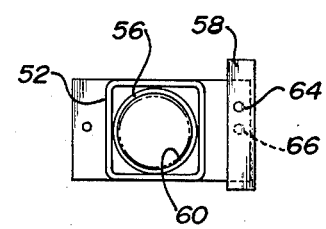
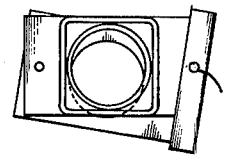

HYDRAULIC BRAKE SYSTEM FOR GOOSENECK TRAILERS

BACKGROUND AND SUMMARY OF THE INVENTION

This invention relates to apparatus for applying hydraulic trailer brakes, and more particularly to apparatus for automatically applying hydraulic trailer brakes in gooseneck trailers.

At the present time there is widespread acceptance and usage of trailers of the type known as gooseneck or fifth wheel-type trailers. As opposed to conventional trailers which connect to structures such as a bumper projecting from the rear of a towing vehicle, gooseneck trailers connect at a point more nearly aligned with the rear wheels of the towing vehicle. For example, a gooseneck trailer is often connected to a ball or similar structure mounted in the bed of a pickup truck and situated above the rear axle of the truck. This relocation of the point of connection of the trailer to the towing vehicle substantially increases the maximum trailer size that can be towed by a particular towing vehicle.

Governmental regulations now require that trailers weighing over 4,000 lbs. be provided with brakes. With respect to gooseneck trailers, the only braking systems that have heretofore been provided for meeting this requirement have comprised electric braking systems and vacuum over hydraulic braking systems. As is well known in the art, both electric braking systems and vacuum over hydraulic braking systems exhibit numerous problems when used in conjunction with gooseneck trailers.

For example, both electric braking systems and vacuum over hydraulic braking systems require an operating handle mounted within a towing vehicle when utilized in conjunction with gooseneck trailers. Both types of braking systems require relatively costly and time consuming maintenance procedures. Electrical braking systems are generally considered to be unsatisfactory and unreliable in operation. Vacuum over hydraulic systems are typically relatively expensive to purchase and install.

The present invention overcomes the foregoing and other difficulties long since associated with the prior art. In accordance with the broader aspects of the invention, apparatus for applying hydraulic trailer brakes includes a post member which is pivotally secured to a towing vehicle. A sleeve member is telescopingly received over the upstanding post member and is pivotally secured to the upper end thereof. An arm extends rearwardly from the sleeve member, and a trailer that is towed by the towing vehicle is secured to the sleeve member. Hydraulic master cylinder apparatus is mounted in the arm for actuation in response to relative pivotal movement between the arm and the upstanding post member. Springs are provided for supporting the weight of the trailer during downhill movement, and shock absorbers are provided for damping relative pivotal movement between the arm and the upstanding post member.

In accordance with more specific aspects of the invention, the bottom of the upstanding post member includes an aperture adapted to receive a ball secured to the towing vehicle. A corresponding aperture is provided in a plate that is pivotally supported at the bottom of the upstanding post member. The apertures in the post member and the plate are initially aligned to receive the ball of the towing vehicle. Thereafter, the plate is moved to a nonaligned postion and is retained in the nonaligned position by a spring loaded pin, whereby the upstanding post member is secured in engagement with the ball.

The hydraulic master cylinder apparatus includes a housing comprising a brake fluid reservoir and a piston which controls the flow of brake fluid into and out of the housing through a port. The housing of the hydraulic master cylinder apparatus is slidably supported on an arm with the piston positioned in engagement with the upstanding post member. A spring is provided for accomodating relative movement between the housing of the hydraulic master cylinder apparatus and the arm upon further relative pivotal movement between the arm and the upstanding post member subsequent to actuation of the piston of the hydraulic master cylinder apparatus.

A lever is pivotally supported on the sleeve member and includes a camming portion positioned for engagement with the upstanding post member. The remote end of the lever is chained to the towing vehicle. Thus, upon accidental disengagement of the upstanding post member from the towing vehicle, the lever is actuated to effect relative pivotal movement between the upstanding post member and the sleeve member, whereupon the hydraulic master cylinder apparatus is actuated to set the trailer brakes. Further pivotal movement of lever causes the camming portion thereof to move over center, whereupon the hydraulic master cylinder apparatus is locked in the actuated condition.

DESCRIPTION OF THE DRAWINGS

A more complete understanding of the invention may be had by reference to the following Detailed Description when taken in conjunction with the accompanying Drawings, wherein:

FIG. 1 is a side view of a pickup truck-gooseneck trailer rig incorporating the invention;

FIG. 2 is a perspective view of an apparatus for applying hydraulic trailer brakes incorporating the invention;

FIGS. 4a and 4b are top views of the ball retaining mechanism of the apparatus of FIG. 2.

DETAILED DESCRIPTION

Figure 3:
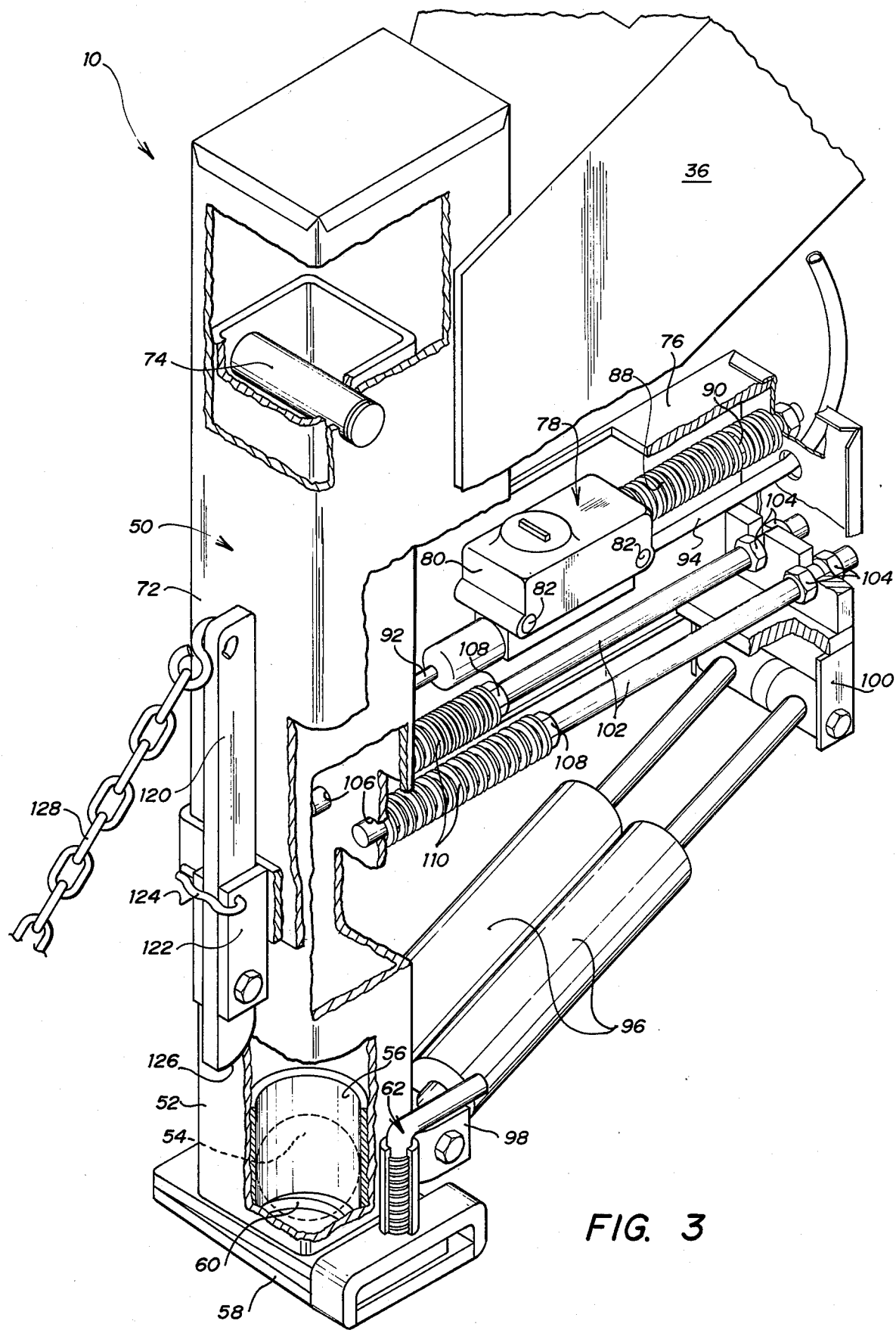
FIG. 3 is an enlarged view similar to FIG. 2 in which certain parts have been broken away more clearly to illustrate certain features of the invention.

Referring now to the drawings, and particularly to FIG. 1 thereof, there is shown a pickup truck-gooseneck trailer rig 10 incorporating apparatus for applying hydraulic trailer brakes constructed in accordance with the present invention. The rig 10 includes a conventional pickup truck 12 comprising a chassis 14 supported on front wheels 16 and rear wheels 18. The chassis 14 includes an engine compartment 20, a cab 22 situated behind the engine compartment 20, and a bed 24 extending rearwardly from the cab 22. A conventional ball of the type utilized for connecting trailers to towing vehicles is mounted in the bed 24 substantially on the longitudinal center line thereof, and generally in alignment with the rear wheels 18 of the pickup truck 12.

The rig 10 further comprises a gooseneck trailer 32. The trailer 32 comprises a chassis 34 having a tongue 36 extending from the front end thereof and supported at the rear by a pair of wheels 38. The trailer 32 may comprise any of the conventional types, including a camper type as shown, a livestock carrying type, a flatbed type, or any of the various other conventional types of gooseneck trailers. The only requirement with respect to the trailer 32 of the rig 10 is that the wheels 38 are provided with hydraulic brakes. The hydraulic brakes of the trailer 32 may comprise drum and shoe type or disc type, with the only requirement being that the brakes are provided with hydraulic pistons or other hydraulically driven actuators for effecting brake actuation.

Referring to FIGS. 2 and 3, the tongue 36 of the gooseneck trailer 32 extends to an apparatus for applying hydraulic trailer brakes 50 incorporating the present invention. Referring particularly to FIG. 3, the apparatus 50 includes an upstanding post member 52 which is secured to a ball 54 mounted in the bed 24 of the pickup truck 12. The connection between the upstanding post member and the ball accommodates pivotal movement of the post member about a normally vertical axis, and thereby permits relative turning movement between the pickup truck 12 and the trailer 32.

The upstanding post member 52 has a tube 56 secured in the bottom end thereof which receives the ball 54. A ball retaining plate 58 having an aperture 60 formed therethrough is pivotally supported at the bottom of the upstanding post member 52. The upstanding post member 52 is provided with a spring loaded pin 62 for securing the plate 58 against relative pivotal movement with respect to the upstanding post member 52.

Referring to FIG. 4a, the aperture 60 of the plate 58 is initially aligned with the tube 56 of the upstanding post member 52. The ball 54 of the pickup truck 12 is then inserted through the aperture 60 and into the tube 56. Thereafter the plate 58 is pivoted into the position shown in FIGS. 3 and 4b, whereupon the plate 58 serves to retain the ball 54 within the tube 56. As is best shown in FIG. 4a, the plate 58 has a pin receiving aperture 64 and the upstanding post member has a pin receiving aperture 66. The apertures 64 and 66 are aligned when the plate 58 is pivoted to the position shown in FIG. 4b, whereupon the spring loaded pin 62 moves into the aperture 66 to secure the plate 58 in position to retain the ball 54 in the tube 56, thereby securing the upstanding post member 52 to the pickup truck 12.

A sleeve member 72 is telescopingly received over the upstanding post member 52. A pivot pin 74 pivotally connects the sleeve member 72 to the upper end of the upstanding post member 52. An arm 76 is secured to the sleeve member 72 and extends rearwardly therefrom. The tongue 36 is welded to the sleeve member 72. It will thus be understood that whereas the upstanding post member 52 is secured to the pickup truck 12 for movement therewith, the tongue 36, the sleeve member 72 and the arm 76 comprise a unitary structure secured to the trailer 32 for movement therewith.

A hydraulic master cylinder apparatus 78 is mounted in the arm 76. The hydraulic master cylinder apparatus 78 includes a housing 80 having a pair of apertures 82 formed therethrough. Referring momentarily to FIG. 2, a pair of rods 84 are received through the apertures 82 and through slots 86 formed in the opposite sides of the arm 76. Referring again to FIG. 3, a compression spring 88 is mounted on a rod 90 and is positioned between the housing 80 of the hydraulic master cylinder apparatus 78 and the arm 76. The spring 88 normally positions the housing 80 as shown in FIGS. 2 and 3, that is, with the rods 84 situated at the forward ends of the slots 86.

The housing 80 of the hydraulic master cylinder apparatus 78 comprises a brake fluid reservoir. The apparatus 78 includes a piston having a piston rod 92 which extends from one end of the apparatus 78. The spring 88 positions the piston rod 92 in engagement with the upstanding post member 52. The piston as represented by the piston rod 92 functions to control the flow of brake fluid into and out of the reservoir as represented by the housing 80 through a port formed therein. The port is connected to a line 94 which in turn extends to the hydraulic brakes of the wheels 38 of the trailer 32.

Assume now that the pickup truck 12 is moving forwardly, towing the trailer 32. Assume further that the brakes of the pickup truck 12 are actuated. This causes a reduction in the forward speed of the pickup truck 12, and therefore a reduction in the forward speed of the upstanding post member 52 due to the connection therebetween.

On the other hand, the momentum of the trailer 32 causes it to continue to move forwardly. Since the tongue 36, the sleeve member 72 and the arm 76 are connected to the trailer 32, the sleeve member 72 and the arm 76 pivot relative to the upstanding post member 52 about the axis of the pivot pin 74. Since the hydraulic master cylinder apparatus 78 is mounted in the arm 76 and since the piston rod 92 thereof engages the upstanding post member 52, relative pivotal movement between the arm 76 and the upstanding post member 52 actuates the piston rod 92 to cause the piston of the apparatus 78 to effect discharge of brake fluid from the housing 80 through the line 94. This in turn causes actuation of the hydraulic brakes of the trailer 32. Upon further relative pivotal movement between the arm 76 and the upstanding post member 52 following full actuation of the piston of the apparatus 78, the spring 88 is compressed to allow relative movement between the housing 80 of the apparatus 78 and the arm 76. This causes the rods 84 to move relatively rearwardly in the slots 86 of the arm 76.

Assume now that the forward speed of the pickup truck 12 is increased relative to that of the trailer 32. The momentum of the trailer 32 causes the sleeve member 72 and the arm 76 to pivot relatively rearwardly about the axis of the pivot pin 74. The spring 88 initially moves the housing 80 of the apparatus 78 forwardly until it is positioned as shown in FIGS. 2 and 3. Thereafter the piston rod 92 moves outwardly, thereby drawing brake fluid into the housing 80. The hydraulic brakes of the trailer 32 are thereupon disengaged and the trailer 32 is thus permitted to increase in forward speed responsive to the towing of the pickup truck 12.

It will thus be understood that the operation of the apparatus for applying hydraulic trailer brakes 50 of the present invention depends upon relative pivotal movement between the arm 76 and the upstanding post member 52. Such pivotal movement is damped and thereby controlled by a pair of shock absorbers 96. The shock absorbers 96 are secured between a bracket 98 mounted at the bottom of the upstanding post member 52 and a bracket 100 mounted at the rear of the arm 76.

There are three operational conditions that must be accommodated in the use of the present invention. The first is operation of the rig 10 on a downhill grade at constant speed. Since the trailer 32 has substantial mass, such downhill operation would normally cause the arm 76 to pivot relative to the upstanding post member 52 about the axis of the pin 74. Such relative pivotal movement between the arm 76 and the upstanding post member 52 would thereupon actuate the apparatus 78 to set the brakes of the trailer 32.

In order to prevent undesired actuations of the brakes of the trailer 32 when the rig 10 is operated on a downhill grade, a pair of rods 102 are mounted in the arm 76 and are secured therein by nuts 104. The rods 102 are slidably received in apertures 106 formed in the upstanding post member 52. Each rod 102 is provided with a spring stop 108. A pair of compression springs 110 are mounted on the rods 102 and are positioned between the upstanding post member 52 and the spring stops 108.

The springs 110 are carefully selected to have adequate capacity to support the weight of the trailer 32 at any desired degree of inclination. The springs 110 therefore prevent actuation of the hydraulic master cylinder apparatus 78 to set the brakes of the trailer 32 when the rig 10 is operating on a downhill grade at constant speed. However, upon decrease in the speed of the pickup truck 12 relative to that of the trailer 32, the springs 110 compress to allow the arm 76 to pivot relative to the upstanding post member 52, whereupon the apparatus 78 is actuated to set the brakes of the trailer 32.

The second operational condition of the rig 10 which must be accommodated in the use of the present invention is that of backing up. Placing the pickup truck 12 in reverse would normally cause the arm 76 to pivot relatively forwardly with respect to the upstanding post member 52, whereupon the hydraulic master cylinder apparatus 78 would set the brakes of the trailer 32. If this were allowed to occur, the rig 10 would effectively be prevented from backing up.

Two methods of preventing this eventuality may be utilized in the practice of the present invention. The first is to provide a solenoid operated valve in the line 94 extending from the hydraulic master cylinder apparatus 78 to the brakes of the trailer 32. Such valve is adapted for actuation whenever the pickup truck 12 is placed in reverse. Upon actuation the valve prevents the flow of brake fluid through the line 94. In this manner the brakes of the trailer 32 remain in the nonactuated state even though the arm 76 is pivoted relative to the upstanding post member 52 responsive to backing movement of the pickup truck 12.

Referring to FIG. 2, the apparatus 50 of the present invention may also be provided with mechanical structure for preventing actuation of the brakes of the trailer 32 when the rig 10 is operated in reverse. A bracket 112 is mounted on the arm 76 and has a pin receiving aperture 114 formed therethrough. An aligned bracket 116 is mounted on the upstanding post member 52. A pin 118 is provided for insertion into the aperture 114 whenever the rig 10 is operated in reverse. Upon insertion in the aperture 114, the pin 118 prevents relative pivotal movement between the arm 76 and the upstanding post member 52. This prevents actuation of the hydraulic master cylinder apparatus 78, and thereby prevents actuation of the brakes of the trailer 32 when the rig 10 is operated in reverse.

The third operational condition of the rig 10 that must be accommodated in the use of the present invention involves the inadvertent disengagement of the upstanding post member 52 from the ball 54. Governmental regulations require that structure be provided for automatically setting the brakes of the trailer 32 in such instances.

A lever 120 is pivotally mounted on a bracket 122 depending from the sleeve member 72 and is normally retained in the position shown in FIGS. 2 and 3 by a shear pin 124. The lower end of the lever 120 comprises a camming surface 126. The upper end of the lever 120 is connected to the pickup truck 12 by means of a chain 128.

Assume now that the upstanding post member 52 becomes disengaged from the ball 54. The entire apparatus 50 thereupon moves rearwardly relative to the pickup truck 12. This causes the chain to pivot the lever 120 downwardly, breaking the shear pin 124 and engaging the camming surface 126 with the upstanding post member 52. Upon further downward pivotal movement the lever 120 pivots the sleeve member 72 and therefore the arm 76 forwardly relative to the upstanding post member 52, thereby actuating the hydraulic master cylinder apparatus 78 to set the brakes of the trailer 32. Further pivotal movement of the arm 76 causes the camming member 126 to move over center, whereby the apparatus 50 of the present invention is locked in the actuated condition. This in turn causes the brakes of the trailer to be locked in the actuated condition, whereby the movement of the trailer 32 is rapidly arrested.

From the foregoing, it will be understood that the present invention comprises numerous improvements over the prior art. Thus, by means of the invention, hydraulic brakes in a gooseneck trailer are automatically operated responsive to braking of the towing vehicle. On the other hand, inadvertent operation of the trailer brakes during movement of the rig down an incline or during backing are prevented. The apparatus includes structure for automatically setting the trailer brakes upon disengagement of the apparatus from the towing vehicle. Other advantages deriving from the use of the invention will readily suggest themselves to those skilled in the art.

What is claimed is:

1. Apparatus for applying hydraulic trailer brakes comprising:
   an upstanding post member;
   means pivotally connecting the lower end of the upstanding post member to a towing vehicle;
   a sleeve member telescopingly received over the post member, the upper end of said sleeve member being rigidly connected to a trailer towed by the towing vehicle;
   pin means extending through the upper end of the post member and the upper end of the sleeve member for pivotally connecting the upper end of the post member to the upper end of the sleeve member;
   an arm secured to the sleeve member at a point substantially above the point of pivotal connection of the post member to the towing vehicle and substantially below the point of pivotal connection of the sleeve member to the post member and extending rearwardly therefrom;
   hydraulic master cylinder means for actuation to discharge hydraulic fluid;
   at least one rod secured to the rearward end of the arm and extending through the arm and slidably received in the upstanding post member;
   compression spring means mounted on the rod and biased against the upstanding post member for normally pivoting the arm and the sleeve member to a position relative to the upstanding post member wherein the hydraulic master cylinder means is deactuated;

shock absorber means connected between the lower end of the upstanding post member and the rearward end of the arm for damping relative pivotal movement therebetween;

said hydraulic master cylinder means comprising a housing defining a brake fluid reservoir, port means, and piston means for effecting brake fluid flow into and out of the housing through the port means;

means mounting the hydraulic master cylinder means within the arm with the housing thereof connected to the arm and the piston engaging the upstanding post member for actuation to effect brake fluid flow in response to relative pivotal movement between the arm and the upstanding post member;

said hydraulic master cylinder mounting means further characterized by rod means slidably supporting the housing of the hydraulic master cylinder means on the arm and spring means biasing the housing of the hydraulic master cylinder means toward a position wherein the piston thereof engages the upstanding post member and accommodating relative sliding movement between the housing of the hydraulic master cylinder means and the arm in response to further relative pivotal movement between the arm and the upstanding post member following actuation of the piston of the hydraulic master cylinder means; and means connecting the hydraulic master cylinder means to the hydraulic brakes of the trailer.

2. The apparatus for actuating hydraulic trailer brakes according to claim 1 wherein the means connecting the upstanding post member to a towing vehicle comprises:

an aperture formed in the bottom of the upstanding post member for receiving a ball therein;

a plate pivotally mounted on the bottom of the upstanding post member for pivotal movement between a first position wherein the aperture is received through the plate and the aperture in the bottom of the upstanding post member and a second position wherein the ball is retained by the plate; and pin means for retaining the plate in the second pivotal position.

3. The apparatus for actuating hydraulic trailer brakes according to claim 1 further including means responsive to disengagement of the upstanding post member from the towing vehicle for pivoting the sleeve member and the arm relative to the upstanding post member to a position wherein the hydraulic master cylinder means is actuated to set the brakes of the trailer and for thereafter locking the sleeve member and the arm in said pivotal position relative to the upstanding post member.

* * * * *